United States Patent
Wong et al.

(10) Patent No.: US 8,063,529 B2
(45) Date of Patent: Nov. 22, 2011

(54) MOTOR

(75) Inventors: Ben To Fan Wong, Hong Kong (CN); Biao Yu, Shenzhen (CN); Tain Jun Liao, Shenzhen (CN)

(73) Assignee: Johnson Electric S.A., La Chaux-de-Fonds (CH)

( * ) Notice: Subject to any disclaimer, the term of this patent is extended or adjusted under 35 U.S.C. 154(b) by 0 days.

(21) Appl. No.: 12/565,227

(22) Filed: Sep. 23, 2009

(65) Prior Publication Data

US 2010/0072849 A1 Mar. 25, 2010

(30) Foreign Application Priority Data

Sep. 23, 2008 (CN) .................. 2008 1 0216336
Oct. 24, 2008 (CN) .................. 2008 1 0217074

(51) Int. Cl.
 *H02K 21/04* (2006.01)
(52) U.S. Cl. ......... 310/154.22; 310/154.21; 310/154.01; 310/154.24; 310/154.25; 310/154.08; 310/40 MM
(58) Field of Classification Search ............. 310/154.22, 310/154.21, 154.03, 154.14, 154.15, 154.24, 310/154.25, 154.01, 154.08, 216.001, 40 MM
See application file for complete search history.

(56) References Cited

U.S. PATENT DOCUMENTS

| | | | |
|---|---|---|---|
| 6,995,488 B1 * | 2/2006 | Yamashita et al. ....... | 310/154.21 |
| 7,427,817 B2 * | 9/2008 | Uenishi et al. ........... | 310/154.22 |
| 7,498,706 B2 | 3/2009 | Kuroda | |
| 7,528,515 B2 | 5/2009 | Kuroda | |

FOREIGN PATENT DOCUMENTS

| | | |
|---|---|---|
| EP | 2157677 A1 | 2/2010 |
| EP | 2157678 A1 | 2/2010 |
| JP | 09224337 A * | 8/1997 |

* cited by examiner

*Primary Examiner* — Quyen Leung
*Assistant Examiner* — Leda Pham
(74) *Attorney, Agent, or Firm* — Muncy, Geissler, Olds & Lowe, PLLC

(57) ABSTRACT

A motor comprises a stator and a rotor (20) disposed within the stator. The stator comprises a shell comprising a plurality of sidewalls (10a-10d) and arcuate connection parts (11a-11d) connecting neighboring sidewalls. The cross section of the shell is a polygon with fillets. The stator also comprises a plurality of magnets (12a-12d) installed inside the arcuate connection parts. The magnets (12a-12d) are mutual arranged at intervals. The outer surface of each magnet (12a-12d) is attached to inner surfaces of the two neighboring sidewalls (10a-10b) and a gap is formed between the magnet and the inner surface of the corresponding arcuate connection part. Air gaps are formed between the inner surface of the magnets (12a-12d) and the outer surface of the rotor. Disposing the magnets inside the arcuate connection parts improves the space utilization ratio. In addition, the gaps formed between the outer surface of magnets and the inner surface of arcuate connection parts may be used for adhesive to fix the magnets to the shell.

8 Claims, 2 Drawing Sheets

& nbsp;
MOTOR

CROSS REFERENCE TO RELATED APPLICATIONS

This non-provisional patent application claims priority under 35 U.S.C. §119(a) from Patent Application No. 200810216336.6 filed in The People's Republic of China on Sep. 23, 2008.

FIELD OF THE INVENTION

This invention relates to an electric motor and in particular, to an electric motor having a square stator.

BACKGROUND OF THE INVENTION

A cross section of a conventional permanent magnet DC motor is shown in FIG. 1. Such motors use a cylindrical shell 1. A rotor 3 is received in the cylindrical shell 1. Permanent magnets 2 are fixed to the inner surface of the cylindrical shell 1 and are distributed around the rotor 3. However, the motor with such outline structure has the following problems: 1) it is easy to roll in the process of transport; 2) the installation is inconvenient and an additional positioning device is required.

A square motor developed in this field in recent years is shown in FIG. 2. The motor uses a square shell 1'. Permanent magnets 2' are installed at the inner surface of the four sidewalls of the shell 1'. A rotor 3' is received in shell 1'. The Permanent magnets 2' are distributed around the rotor 3'. Although such motor with square shell solves the above-mentioned shortcomings of conventional cylindrical motor, it has the following problems: 1) the shell has low space utilization rate, and the space of four angles are not used; 2) the diameter of rotor is equal to the size of shell minus the thickness of shell and the thickness of the permanent magnet. In the requirement of the motor shell having relatively small size, the diameter of rotor 3' is restricted by the thickness of the shell 1' and the magnet 2'.

SUMMARY OF THE INVENTION

Hence there is a desire for a motor with a square or non-round stator with a higher space utilization.

Accordingly, in one aspect thereof, the present invention provides an electric motor comprising a stator and a rotor disposed within the stator and having an outer surface confronting the stator, wherein the stator comprises a shell, the shell comprising a plurality of sidewalls and arcuate connection parts connecting neighboring sidewalls, the cross section of the shell being a polygon with rounded corners; the stator also comprising a plurality of magnets disposed inside the arcuate connection parts, an outer surface of each magnet being adjacent inner surfaces of two neighboring sidewalls and a gap being formed between each magnet and the corresponding arcuate connection part, air gaps being formed between an inner surface of the magnets and the outer surface of the rotor.

Preferably, the width of the air gap between the rotor and the inner surface of each magnet is not constant, the air gap being narrower at the circumferential middle of the inner surface than at the circumferential edges.

Preferably, the inner surfaces of the magnets are arcuate in the circumferential direction and the air gap is narrowest corresponding to the thickest part of magnets and is widest corresponding to the thinnest parts of the magnets.

Preferably, the radius of curvature of the inner surface of the arcuate connection parts is greater than the radius of curvature of the outer surface of the magnets.

Preferably, the arcuate connection parts are of uniform thickness and their centers of radius are deviated from the rotational center of the rotor.

Preferably, the ratio of the radius of curvature of the inner surface of the arcuate connection part and the radius of curvature of the inner surface of the magnets is in the range from 1.1 to 1.4.

Preferably, the shell has a uniform thickness.

Alternatively, the thickness of the arcuate connection parts is greater than the thickness of the sidewalls.

Preferably, there are four magnets which form four or eight magnetic poles.

Preferably, the cross section of the shell is square and there are four magnets respectively disposed in the four arcuate connection parts of the shell.

The beneficial effects of the present invention include an improved space utilization ratio achieved by disposing the magnets of motor inside the arcuate connection parts. In addition, gaps formed between the outer surface of magnets and the inner surface of arcuate connection parts can be used for adhesive to fix the magnets to the shell.

BRIEF DESCRIPTION OF THE DRAWINGS

A preferred embodiment of the invention will now be described, by way of example only, with reference to figures of the accompanying drawings. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 3:
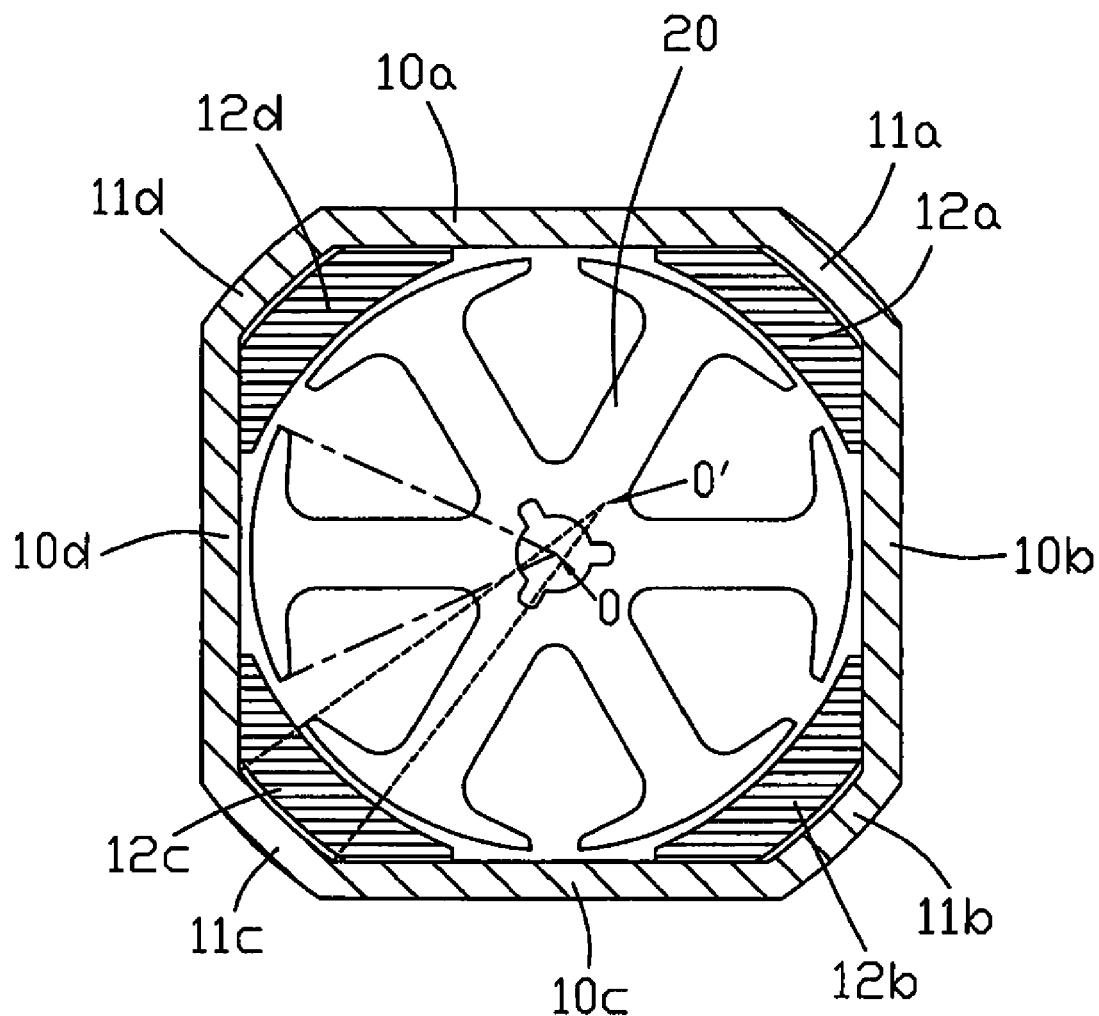
FIG. 3 is a schematic cross sectional view of a motor in accordance with an embodiment of the present invention.

As shown in FIG. 3, a motor of an embodiment in accordance with the present invention includes a stator and a rotor 20 disposed within the stator. The stator comprises a shell and magnets 12a-12d disposed inside the shell. The radial cross section of the shell is square with rounded corners which comprises four sidewalls 10a-10d and four arcuate connection parts 11a-11d. Specifically, the arcuate connection part 11a is connected between two neighboring sidewalls 10a and 10b, and the arcuate connection part 11b is connected between two neighboring sidewalls 10b and 10c, etc. Four magnets 12a-12d are respectively installed inside the four corners or arcuate connection parts 11a-11d. The outer surface of each magnet is attached to the inner surface of the two neighboring sidewalls and a gap is formed between the outer surface of magnet and the inner surface of the corresponding arcuate connection part. For example, the outer surface of magnet 12a is attached to the inner surface of sidewalls 10a, 10b, and forms a gap with the inner surface of arcuate connection part 11a. Optionally, adhesive is placed in the gaps to fix the magnets to the shell.

In addition, Air gaps are formed between the inner surface of magnets 12a-12d and the outer surface of the rotor 20, which allow the rotor to rotate corresponding to the stator. Preferably, the width of the air gaps, measured in the radial direction of the motor, between the inner surface of magnets 12a-12d and the outer surface of rotor 20 is not constant. Specifically, the width of the air gap between that part of the inner surface of magnets 12a-12d corresponding to the arcuate connection part 11a-11d and the rotor 20 is less than the width of the air gap between the other parts of the inner surface of magnets 12a-12d and the rotor 20. As another preferred example, the inner surfaces of magnets 12a-12d are arcuate. Along the arcuate surface, the air gaps corresponding to the thickest part of magnets 12a-12d are the narrowest, and the air gaps corresponding to the thinnest part of magnets 12a-12d are the widest. Such inconsistencies in the width of air gap can help reducing the magnetic detent torque of rotor 20 and reduce the risk of demagnetisation. Preferably, the variation in the width of the air gap is smoothly variable as shown in FIG. 3.

Figure 1:
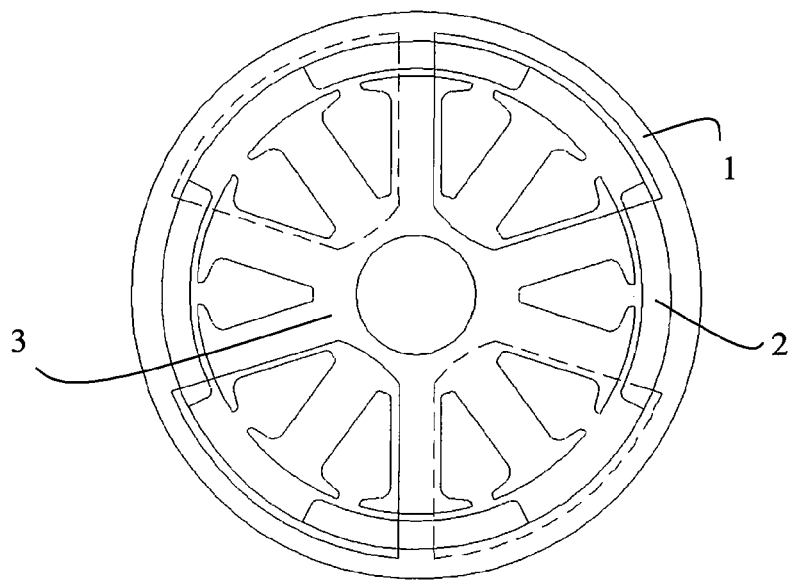
FIG. 1 is a schematic cross sectional view of a conventional DC motor.
Figure 2:
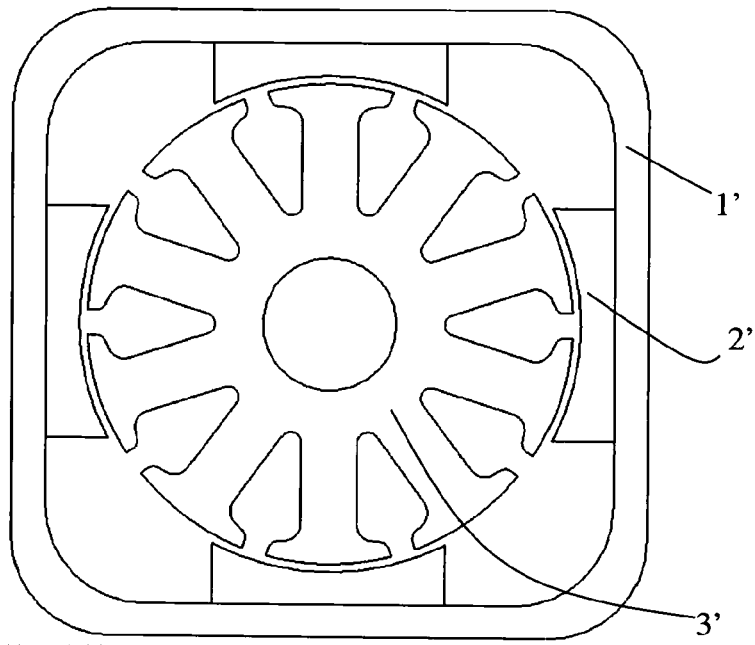
FIG. 2 is a view similar to FIG. 1, of another conventional DC motor.

As a preferred embodiment, the arcuate connection parts 11a-11d are of a uniform thickness (e.g. a thickness of 1 mm) which is convenient to manufacture. The center of radius of each arcuate connection part is deviated from the rotation center of rotor 20. For example, as shown in FIG. 1, the center of radius O' of the arcuate connection part 11c is deviated from the rotational center O of rotor 20. In this embodiment, the curvature of arcuate connection part 11a-11d is less than the outer surface curvature of rotor 20. So it appears to be relatively smooth.

As an improvement plan, the inner surface of magnets 12a-12d are an arcuate surface curved in the circumferential direction of the rotor. The radius of curvature of the inner surface of arcuate connection parts 11a-11d are more than the radius of curvature of the outer surface of the magnets 12a-12d.

As another improvement plan, the ratio of the radius of curvature of the inner surface of the arcuate connection parts 11a-11d to the radius of curvature of the inner surface of magnets 12a-12d is in the range from 1.1 to 1.4. Most preferably, the ratio is approximately 11.8/9.95, or about 1.19.

As another improvement plan, the magnets 12a-12d have symmetric arcuate surfaces. The symmetrical center line of each magnet is through the rotation center O of rotor 20. The radius of curvature of the inner surface of each magnet 12a-12d is greater than the radius of curvature of the outer surface of rotor 20. In this plan, the width of the air gaps between the rotor 20 and the magnets are not constant. The width of air gap in the symmetrical center of magnets is minimum. The width of the air gaps at the two ends of magnets are maximum. This symmetrical structure is convenient to manufacture and assemble.

As a preferred plan, the shell has a uniform thickness (e.g. the thickness of 1 mm) which is convenient to process and manufacture, and effectively uses the space inside the shell.

As a optional plan, the thickness of the arcuate connection parts 11a-11d are more than the thickness of the sidewalls 10a-10d. For example, the thickness of sidewalls 10a-10d is 1 mm and the thickness of arcuate connection parts 11a-11d is 1.1 mm.

In the embodiment shown in FIG. 3, when the polarization direction of two neighboring magnets 12a and 12b are north pole outward, the other two neighboring magnets 12c and 12d are south pole outward. The magnetic lines issued by the north pole of the magnet 12a extend through the shell and enter the south pole of magnet 12d, and then return to the south pole of magnet 12a through the rotor 20. Similarly, the magnetic lines issued by the north pole of magnets 12b extend through the shell and enter the south pole of magnet 12c, and then return to the south pole of magnet 12b through the rotor 20. So the four magnets 12a-12d form two magnetic poles. Also, four magnets 12a-12d may form alternate polarization directions, thus forming four magnetic poles or forming the same polarization directions to form eight magnetic poles. The technician in the field should understand that the shell of stator is not limit to four sidewalls and four arcuate connection parts. The shell of the stator can comprise more sidewalls and arcuate connection parts.

In the description and claims of the present application, each of the verbs "comprise", "include", "contain" and "have", and variations thereof, are used in an inclusive sense, to specify the presence of the stated item but not to exclude the presence of additional items. Also, although the invention is described with reference to one or more preferred embodiments, it should be appreciated by those skilled in the art that various modifications are possible. Therefore, the scope of the invention is to be determined by reference to the claims that follow.

The invention claimed is:

1. An electric motor comprising a stator and a rotor disposed within the stator and having an outer surface confronting the stator, wherein the stator comprises a shell, the shell comprising at least four flat sidewalls and arcuate connection parts connecting adjacent neighboring sidewalls, the cross section of the shell being a polygon with rounded corners formed by the connection parts; the stator further comprising a plurality of magnets disposed inside the arcuate connection parts, each magnet having an outer surface contacting inner surfaces of two adjacent sidewalls with a gap being formed between each magnet and the corresponding arcuate connection part such that the magnets do not contact the arcuate connection part, and air gaps being formed between an inner surface of the magnets and the outer surface of the rotor, and wherein the width of the air gap measured in the radial direction between the rotor and the inner surface of each magnet is not constant, the air gap being narrower at the circumferential middle of the inner surface than at the circumferential edges, and the inner surfaces of the magnets are arcuate in the circumferential direction and the air gap is narrowest corresponding to the thickest part of magnets and is widest corresponding to the thinnest parts of the magnets.

2. The motor of claim 1, wherein the radius of curvature of the inner surface of the arcuate connection parts is more than the radius of curvature of the outer surface of the magnets.

3. The motor of claim 1, wherein the arcuate connection parts are of uniform thickness and their centers of radius are deviated from the rotational center of the rotor.

4. The motor of claim 1, wherein the ratio of the radius of curvature of the inner surface of the arcuate connection part and the radius of curvature of the inner surface of the magnets is in the range from 1.1 to 1.4.

5. The motor of claim 1, wherein the shell has a uniform thickness.

6. The motor of claim 1, wherein the thickness of the arcuate connection parts is greater than the thickness of the sidewalls.

7. The motor of claim 1, wherein there are four magnets which form four or eight magnetic poles.

8. The motor of claim 1, wherein the polygon is a square and there are four magnets respectively disposed in the four arcuate connection parts of the shell.

* * * * *